United States Patent
Schenk

(10) Patent No.: US 9,341,218 B2
(45) Date of Patent: May 17, 2016

(54) METHOD FOR ADAPTING A SEPARATING CLUTCH IN A DRIVE TRAIN SYSTEM OF A VEHICLE AND DRIVE TRAIN SYSTEM

(75) Inventor: Rene Schenk, Tamm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1013 days.

(21) Appl. No.: 13/123,443

(22) PCT Filed: Sep. 14, 2009

(86) PCT No.: PCT/EP2009/061880
§ 371 (c)(1),
(2), (4) Date: Jun. 15, 2011

(87) PCT Pub. No.: WO2010/040621
PCT Pub. Date: Apr. 15, 2010

(65) Prior Publication Data
US 2011/0295455 A1  Dec. 1, 2011

(30) Foreign Application Priority Data
Oct. 8, 2008  (DE) .......................... 10 2008 042 685

(51) Int. Cl.
*B60W 10/00* (2006.01)
*B60W 20/00* (2006.01)
(Continued)

(52) U.S. Cl.
CPC .............. *F16D 48/06* (2013.01); *B60W 10/02* (2013.01); *F16D 2500/1066* (2013.01);
(Continued)

(58) Field of Classification Search
CPC ..... B60W 10/02; B60W 10/06; B60W 10/08; B60W 20/00; F16D 2500/3065; F16D 2500/30421; F16D 2500/30816; F16D 2500/70605; F16D 48/06; F16D 48/064; F16H 61/143; F16H 61/145; B60K 6/38
USPC ................ 701/22, 68, 82; 903/902, 912, 946; 180/65.21, 65.265, 65.275–65.285
See application file for complete search history.

(56) References Cited

U.S. PATENT DOCUMENTS 5,499,954 A * 3/1996 Wagner et al. ................ 477/174
8,062,173 B2 * 11/2011 Allgaier et al. .................. 477/5
(Continued)

FOREIGN PATENT DOCUMENTS

DE  102006048355  4/2008
DE  102006048358  4/2008
(Continued)

OTHER PUBLICATIONS
International Search Report for PCT/EP2009/061880, dated Dec. 7, 2009.

*Primary Examiner* — Jack W Keith
*Assistant Examiner* — Chuong P Nguyen
(74) *Attorney, Agent, or Firm* — Norton Rose Fulbright US LLP

(57) ABSTRACT

A method for adapting a separating clutch in a drive train system of a vehicle, the drive train system having an electric machine, an internal combustion engine as well as an automatic transmission having an hydraulic torque converter and a torque-converter lockup clutch, and the separating clutch lying between the electric machine and the internal combustion engine, and the internal combustion engine being started by the electric machine while the electric machine drives the vehicle, having the following steps: in a time interval, the separating clutch is operated in slip operation for cranking up the internal combustion engine, in the time interval an expected rotary speed change of the electric machine is calculated, the rotary speed change expected by calculation is compared to the actually occurring rotary speed change for deviation and the deviation ascertained is used to adapt the separating clutch.

7 Claims, 3 Drawing Sheets

(51) Int. Cl.
*F16D 48/06* (2006.01)
*B60W 10/02* (2006.01)

(52) U.S. Cl.
CPC ............... *F16D 2500/3065* (2013.01); *F16D 2500/30421* (2013.01); *F16D 2500/30816* (2013.01); *F16D 2500/50251* (2013.01); *F16D 2500/70264* (2013.01); *F16D 2500/70605* (2013.01); *F16H 2342/04* (2013.01)

(56) References Cited

U.S. PATENT DOCUMENTS

| | | | |
|---|---|---|---|
| 8,116,957 B2* | 2/2012 | Oh et al. .......................... 701/67 |
| 8,167,066 B2* | 5/2012 | Joos et al. ................ 180/65.265 |
| 8,326,475 B2* | 12/2012 | Yoshida et al. ................. 701/22 |
| 8,480,536 B2* | 7/2013 | Weiss et al. ....................... 477/5 |
| 8,594,913 B2* | 11/2013 | Steuernagel .................. 701/113 |
| 2007/0056784 A1* | 3/2007 | Joe et al. ...................... 180/65.2 |
| 2007/0246273 A1* | 10/2007 | Tenbrock et al. ............ 180/65.2 |
| 2007/0246274 A1* | 10/2007 | Dreibholz et al. ........... 180/65.2 |
| 2007/0278022 A1* | 12/2007 | Tanishima ................... 180/65.2 |
| 2010/0056328 A1* | 3/2010 | Schenk et al. .................... 477/8 |
| 2011/0029174 A1* | 2/2011 | Schenk ............................ 701/22 |
| 2013/0247870 A1* | 9/2013 | Sauvlet et al. ................ 123/352 |

FOREIGN PATENT DOCUMENTS

| | | | | |
|---|---|---|---|---|
| EP | 1 840 401 | 10/2007 | | |
| EP | 2 014 946 | 1/2009 | | |
| JP | 11-82261 | 3/1999 | | |
| JP | 2005-508779 | 8/2004 | | |
| WO | WO 03/006841 | 1/2003 | | |
| WO | WO 2007/099003 A1 * | 9/2007 | ............ B60W 20/00 |
| WO | WO 2008/049662 | 5/2008 | | |
| WO | WO 2008/064633 | 6/2008 | | |
| WO | WO 2010/040621 | 4/2010 | | |

* cited by examiner

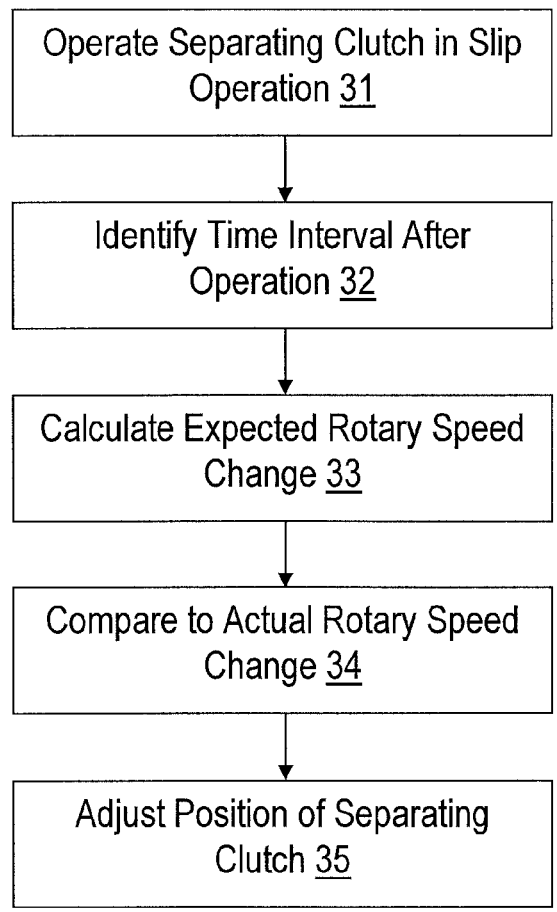

METHOD FOR ADAPTING A SEPARATING CLUTCH IN A DRIVE TRAIN SYSTEM OF A VEHICLE AND DRIVE TRAIN SYSTEM

FIELD OF THE INVENTION

The present invention relates to a method for adapting a separating clutch in a drive train system of a vehicle, the drive train system having an electric machine, an internal combustion engine as well as an automatic transmission having an hydraulic torque converter and a torque-converter lockup clutch. The present invention also relates to a corresponding drive train system.

BACKGROUND INFORMATION

Drive train systems of a vehicle are known in principle, which include an electric machine and an internal combustion engine so as to develop an hybrid drive, a separating clutch being provided between the electric machine and the internal combustion engine, so as to separate from each other or connect to each other the electric machine and the internal combustion engine during operation, and the drive train system having an automatic transmission having an hydraulic torque converter and a torque-converter lockup clutch after the electric machine. During the operation using the electric machine, in this case, the internal combustion engine, which has no dedicated starter, is able to be started by the electric machine. The abovementioned configuration permits the electrical driving using the drive by the electric machine and opened separating clutch. At increased power demand or declining battery capacity, the internal combustion engine has to be started so that the storage battery may be loaded and/or the electric machine may be supported. This starting takes place by coupling the internal combustion engine into the drive train, with the electric machine running, in such a way that the electric machine drives the internal combustion engine until the latter runs under its own power. This starting of the internal combustion engine by the electric machine must take place without causing interference in the drive train, especially without a torque change or pulse change noticeable by the driver. The separating clutch between the internal combustion engine, that is to be started, and the running electric machine, that is functioning as starter, is enclosed in such a way, in this instance, that it grips using a specific slip torque. In that way, the internal combustion engine is accelerated until it has approximately reached the same rotary speed as the electric machine. The additional torque required for this has to be provided by electric machine. This is possible relatively easily if the electric machine has sufficient power reserves and torque reserves and the information on the clutch torque is reproducible very accurately and reliably. For this reason, only incomplete operating guidance is possible when the electric machine is only driven with the additional torque for the start of the internal combustion engine. Data concerning the clutch torque are inaccurate with respect to magnitude and also with respect to time characteristic (slipping of the clutch), and may vary greatly over one operating cycle. In order to correct such sources of error, the rotary speed of the electric machine is additionally influenced during the starting of the internal combustion engine. In order to do this, at the beginning of the starting process of the internal combustion engine, the torque-converter lockup clutch of the torque converter is opened. This gives rise to a slip at the torque converter, the desired, unchanged speed of the following drive train having to be held in reserve by a slip speed. The slip, in this context, is a function of the drive torque that is to be transmitted. But then, if the clutch torque, precontrolled to the electric machine, that is, the clutch torque (that is expected and on which the operating guidance is based) and the actual clutch torque present at the separating clutch are clearly different, there is thus a nonnegligible error with regard to expectations and actual conditions, the rotary speed regulation of the electric machine is not able to correct this error sufficiently rapidly, since the processes during the coupling in of the separating clutch and the start of the internal combustion engine run very rapidly and dynamically, not even if, as in the normal case, the respective rotary speeds of the electric machine are very reliable and easily measurable and controllable.

SUMMARY

Example embodiments of the present invention provide a method to record the accuracy of the actual clutch torque at the separating clutch, and to be able correspondingly to control the operating guidance of the separating clutch with respect to the expected clutch torque of the separating clutch, so that operating guidance is possible without undesirable, perceptible pulse changes or torque changes for the driver.

To do this, a method is provided for adapting a separating clutch in a drive train system of a vehicle, the drive train system having an electric machine, an internal combustion engine as well as an automatic transmission having an hydraulic torque converter and a torque-converter lockup clutch, and the separating clutch lying between the electric machine and the internal combustion engine, and the internal combustion engine being started by the electric machine while the electric machine drives the vehicle. The following steps are provided:

- In a time interval $t_{4,5}$, the separating clutch is operated in slip operation for cranking up the internal combustion engine,
- in the time interval $t_{4,5}$ an expected rotary speed change of the electric machine is calculated,
- the rotary speed change expected by this calculation is compared to the actually occurring rotary speed change for deviation and
- the deviation ascertained is used to adjust the separating clutch.

For the operating guidance of the separating clutch during the starting of the internal combustion engine, the separating clutch is therefore operated in slip operation, the rotary speed change of the electric machine expected hereby being calculated from specified, known parameters, that are known from the construction of the drive train. For, in order to be able to continue to drive the vehicle uniformly and, at the same time to be able to accelerate the internal combustion engine up to its start, the rotary speed of the electric machine has to increase, based on the slip operation. The actually occurring rotary speed change is measured, this measured value being compared to the rotary speed change expected by the calculation. If there is a deviation, one may assume that it may be attributed to the clutch parameter, whereby this deviation is able to be used for operating guidance, namely, for the adaptation of same for operating the separating clutch.

In one development of the method, for the calculation of the expected rotary speed difference, the torque of the electric machine $M_{EIM}$, the torque of the torque-converter lockup clutch $M_{LC}$ assigned to the converter, the torque of the torque converter $M_{converter}$ and the torque of the separating clutch $M_{K1}$ are taken into account. The torque of the electric machine is able to be ascertained relatively accurately and simply, and, in the last analysis, is used as reference torque for the adjustment. The torque of the torque converter, for instance, is simulated by a simple behavior model. During the start of the internal combustion engine, in general preferably only small rotary speed differences occur, so that the influence of the torque converter is not excessively large, and the simple model is sufficient.

In one method development, the torque $M_{LC}$ of the torque-converter lockup clutch required for ascertaining the pulse balance is recorded at a time $t_1$ to $t_2$, by driving the latter while having slip, and the value recorded is corrected via the dynamic behavior of the rotary speed of the electric machine $n_{EIM}$ observed in the process, preferably according to the relationship $M_{LC} = M_{EIMt1} - M_{dynamic\ correction} + M_{average\ change\ of\ electric\ machine}$.

In one preferred development of the method, the following relationship is used for the calculation of the expected rotary speed change, the rotary speed change corresponding to a change in the angular speed:

$$\Delta\varpi = \frac{\int_{t4}^{t5} (M_{EIM} - M_{LC} - M_{converter} - M_{K1}) \cdot dt}{J}$$

The numerator of this relationship is the momentum change. At time $t_4$, at which the integration of the torque change begins, the separating clutch has hunted to a stationary value, and the internal combustion engine begins to rotate along with it and to accelerate. At time $t_5$, at which the integration is ended, the internal combustion engine has reached approximately the rotary speed of the electric machine, so that there is just still slip present. In this interval between $t_4$ and $t_5$ the pulse balance is calculated by the specified relationship. An earlier calculation, for instance, at a time at which the separating clutch, between the internal combustion engine and the electric machine, is brought to the torque required for the engine start, would be faulty because of high change speeds, especially if the phase position of the input variables is not correct and based on running times occurring in unfavorable circumstances of the CAN bus, on which transmission of the corresponding data takes place. Based on the circumstance that, in a control unit, integration cannot take place continuously, the formula is calculated by summation in a computing grid of such a control unit, in the following manner:

$$\Delta\omega = \frac{\sum_{t4}^{t5} (M_{MEIM} - M_{LC} - M_{converter} - M_{K1}) \cdot \Delta t}{J}$$

In this context, $\Delta\omega$ as the change in speed is the expected rotary speed change and J (in the denominator) is the moment of inertia of the drive train. Moment of inertia J of the drive train is specified constructively and may be regarded as a constant, in this instance, since, during the service life of the drive train, it does not change, or changes only in negligible form. As a result, the integral formation takes place via an iterative summation. In these relationships, the torque of the electric machine $M_{EIM}$ is the driving torque, and therefore positive, the torque of torque-converter lockup clutch $M_{LC}$ is a braking torque, and therefore negative, the torque of the torque converter $M_{converter}$ is a braking torque, and therefore also negative and the torque of the separating clutch $M_{K1}$ is also a braking torque, and therefore also negative. Accordingly, the sum of all torques is formed in consideration of the effective direction. If this is equal to zero, the rotary speed of the electric machine will remain constant. If the sum is not equal to zero, however, the electric machine will accelerate or decelerate. This calculation reflects the expected value for the time period $t_4$ to $t_5$ described. If all the quantities in this relationship are correct, the rotary speed will actually behave in that way, that is, a corresponding rotary speed measurement in the interval $t_4$, $t_5$ will not yield a deviation from the precalculated rotary speed. If the precalculated value (the expected value of the rotary speed change) does not agree sufficiently accurately with the actually measured value, it is assumed that the error was caused by the separating clutch. The corresponding characteristic line of the separating clutch is then changed for the next start of the internal combustion engine, so that the error turns out smaller for the next start, and is preferably equal to zero. Let us say, for example, the actual rotary speed, as is yielded based on the rotary speed measurement in interval $t_4$, $t_5$, turns out greater than the calculated expected rotary speed change has predicted. In this case, the separating clutch has supplied too much torque and is now changed in its operating guidance, namely, in its slip behavior and its closing behavior in such a way that for a demand of the same kind it sets less torque. Such adaptations are carried out meaningfully only for such starts of the internal combustion engine in which no extreme boundary conditions have occurred in the operating guidance of the drive train, such as high rotary speed gradients, transmission shifting, and very high or very low rotary speeds. The adaptation is only carried out if the start of the internal combustion engine is triggered, i.e. begun at closed torque-converter lockup clutch.

In one method development, the actual rotary speed change is ascertained using a rotary speed sensor and/or from the electrical variables of the electric machine. The actual rotary speed change may be ascertained using a rotary speed sensor, in a known manner, or directly from the electrical variables of the electric machine, namely, especially from voltage and current consumption.

In one preferred method development, it is provided that the separating clutch have a characteristic line and that the characteristic line be changed for the adaptation of the separating clutch. The characteristic line, in this instance, is stored for an operating guidance in a control device, for example, particularly in the control unit of the motor vehicle, and is drawn upon for the operating guidance. The entire operational performance of the separating clutch is able to be reflected in such a characteristics line and/or in a type of characteristics map. For the adaptation of the separating clutch, that is, when a rotary speed change is observed that is actually greater or less than calculated ahead of time, the characteristics line of the separating clutch is changed and the changed characteristics line is drawn upon for future operating guidance of additional start processes of the internal combustion engine by the electric machine. In this way, particularly ageing processes of the separating clutch and/or additional components of the drive train may be taken into account, as long as these enter into the behavior of the separating clutch and/or are able to be compensated for by the operating guidance of the separating clutch. In this way, during the entire service life of the drive train and its components, it is possible to have trouble-free operating guidance of the drive train that is as comfortable as possible for the driver, during the starting of the internal combustion engine by the electric machine, during driving operation.

In one method development, the characteristics line is a function of the clutch-control travel of the separating clutch and of a transmitted slip torque of the separating clutch.

Consequently, the characteristics line reflects a clutch-control travel between the state "open" and the state "closed", as well as a slip torque present in each case in various states between these two states "open" and "closed".

Furthermore, a drive train system of a vehicle is provided which has an electric machine, an internal combustion engine as well as an automatic transmission having an hydraulic torque converter and torque-converter lockup clutch, and the separating clutch lying between the electric machine and the internal combustion engine, and the internal combustion engine being able to be started by the electric machine during the drive of the vehicle taking place using the electric machine. A control device is provided for the operating guidance of the separating clutch and/or of the drive train system during the start of the internal combustion engine, especially as recited in one or more of the method developments described above. Consequently, the control device is provided for the operating guidance of the separating clutch and/or of the drive train system.

The control device is preferably a component of a control unit of the vehicle, especially integrated into it or provided as a software application for processing in the control unit of the vehicle. In this way, one may produce a simple, integrated design approach in a cost-effective manner.

The present invention is explained below in more detail on the basis of an exemplary embodiment, without being limited to the latter, however.

BRIEF DESCRIPTION OF THE DRAWINGS

FIG. 3 shows a flow diagram of an exemplary embodiment.

DETAILED DESCRIPTION

Figure 1:
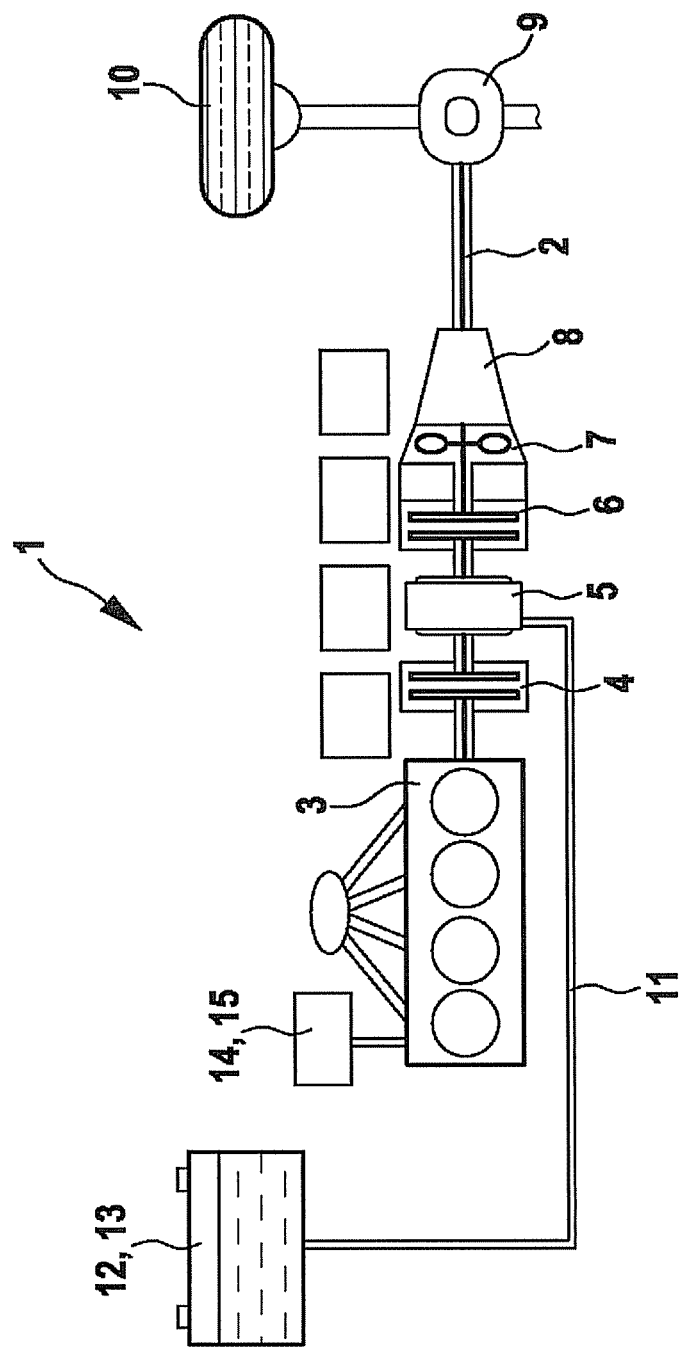
FIG. 1 illustrates a drive train system.

FIG. 1 shows a drive train system 1 of an hybrid vehicle that is not shown, having a drive train 2.

Drive train system 1 has an internal combustion engine 3, which is mechanically operationally connected to an electric machine 5 via a separating clutch 4. Downstream from electric machine 5 in drive train 2 is a torque-converter lockup clutch 6 for the operating connection of a torque converter 7 of an automatic transmission 8, and downstream from the latter, in turn, there is a differential 9 for distributing the driving force to drive wheels 10. Electric machine 5 is connected via electric lines 11 to a storage battery 12 as the electrical energy store 13. A control device 14 is provided for the operating guidance of drive train system 1, especially of separating clutch 4, and it is preferably associated with control unit 15 of the motor vehicle that is not shown. The vehicle that is not shown may be driven via drive train system 1 either purely electrically, using electric machine 5 fed by storage battery 12, separating clutch 4 being open, that is, internal combustion engine 3 being decoupled from the remaining drive train 2, or driven by internal combustion engine 3, separating clutch 4 being closed and electric machine 5 being switched to be a generator, and hereby recharging storage battery 12. Furthermore, an operation is possible in which electric machine 5 and internal combustion engine 3 act in common with force upon drive train 2, for instance, under driving conditions in which a very high torque requirement takes place and internal combustion engine 3 supports electric machine 5.

Internal combustion engine 3 does not have its own starter, or rather, electric machine 5 is used as starter for internal combustion engine 3. This may take place at standstill of the vehicle, that is, when automatic transmission 8 is coupled out (i.e. in the P- or N-position, particularly during a cold start of internal combustion engine 3).

However, the start of internal combustion engine 3 may also take place from the driving operation, when the vehicle (not shown) is driven using electric machine 5, especially when control unit 15 determines that there is a decreasing charging capacity of storage battery 12, and for its recharging electric machine 5 is operated as a generator, and the drive of the vehicle (not shown) as well as of electric machine 5 is supposed to take place via internal combustion engine 3. To do this, separating clutch 4 is closed, whereby internal combustion engine 3 is accelerated until it runs by itself. For this, separating clutch 4 is controlled to form a certain slip torque; as a result, separating clutch 4 is not completely closed, but drives internal combustion engine 3 via a regulated slip. In this instance, internal combustion engine 3 acts in a braking manner on electric machine 5, so that the latter has to deliver an higher torque for the purpose of keeping up the torque in remaining drive train 2, and especially for supplying torque to drive wheels 10, that is, using a greater rotary speed than before. The additional torque that is required for driving, namely for starting internal combustion engine 3, is supplied by electric machine 5. In order to make possible an operation in this starting phase of internal combustion engine 3 that is as little perceptible as possible, in particular to avoid a sudden pulse change and torque change, the speed of electric machine 5 is regulated during the starting process of internal combustion engine 3. To do this, at the beginning of the starting process, torque-converter lockup clutch 6 between the electric machine and the torque converter is opened, whereby a slip comes about on torque converter 6 which is kept in reserve via a slip speed. This slip is a function of the drive torque that is to be transmitted. This is required because the electric machine frequently has no reserves to provide the torque supply, in addition to the instantaneously present driving operation, for starting internal combustion engine 3, imperceptibly to the driver. The rotary speed of electric machine 5 is very well measurable and able to be regulated dynamically, whereby one is able to achieve a starting process imperceptible to the driver, principally by precontrolling the slip at separating clutch 4 and by regulating the rotary speed of electric machine 5. The regulation of the rotary speed of the electric machine is required because the data present for the operating guidance the clutch torque of separating clutch 4, both with regard to the quantity and time in the course of the clutch torque in the process of closing separating clutch 4 are relatively inaccurate, and are dependent on the wear condition of separating clutch 4 and the operating conditions. The starting process is the more frictionless, the more accurately the precontrolled clutch torque/the regulated rotary speed of electric machine 5 agree with the actual clutch torque of separating clutch 4. If the agreement is low, that is, if the error between the precontrolled clutch torque/precontrolled rotary speed and the actual clutch torque is large, the rotary speed regulation of the electric machine is not able to remove the error fast enough, since the coupling-in process is extremely dynamic. Therefore, an adaptation is required by which separating clutch 4 is able to perform in its operating guidance with respect to the deviation of the actual clutch torque from the precontrolled clutch torque.

Figure 2:
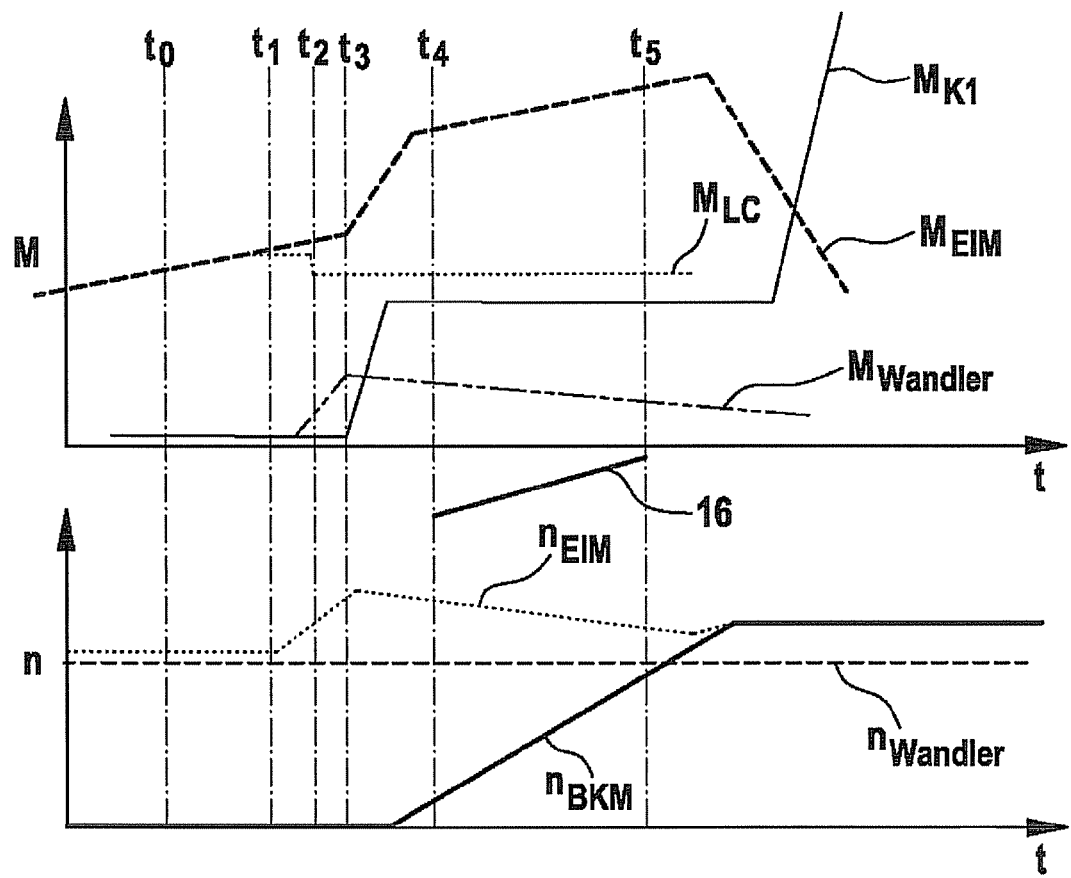
FIG. 2 illustrates a torque diagram and a rotary speed diagram for the drive train system.

FIG. 2, in the upper partial illustration, shows torque curves M and in the lower partial illustration, shows torque curves n, torque M and rotary speed n being on the ordinate (y axis) in this case and the curve over time of the restarting process of internal combustion engine (compare FIG. 1) from the electrical driving operation of the vehicle (not shown) is shown on the abscissa (x axis). In this connection, the individual points in time designate the following:

$t_0$: Triggering of the (re-)starting process of internal combustion engine 3 from the electrical driving operation, using electric machine 5 (in FIG. 2, reference numerals not shown refer to FIG. 1). In the triggering of the start, torque-converter lockup clutch 6 of torque converter 7 is opened, until the latter works having slip. This state of torque-converter lockup clutch 7 in slip operation is maintained for the remaining curve over time of the start.

$t_1$: Detection of the slip of torque-converter lockup clutch 6 of torque converter 7 via the rotary speed difference between electric machine 5 and the turbine rotary speed of torque converter 7 (since torque-converter lockup clutch 6 is no longer rigidly connected to the turbine of torque converter 7, the rotary speed of electric machine 5 increases).

The speed at which the rotary speed of electric machine 5 increases is determined by the excess torque and the moment of inertia of electric machine 5, and the parts rigidly connected to it. In order to determine the torque actually transmitted by torque-converter lockup clutch 6, the torque of electric machine 5, as well as the proportion used for the acceleration, have to be determined.

$t_2$ Determination of the rotary speed increase of electric machine 5 as compared to time $t_1$ and recalculation, while taking into account the moment of inertia which is conditioned upon the type of construction for drive train system 1 (and thus remaining essentially constant), according to the formula $M = J \Delta\omega/\Delta t$, M being the torque, J being the moment of inertia of the components of drive train 2, $\omega$ being the angular speed and t the time. Since, during the determination of this rotary speed increase, that is, essentially during the measuring time, the torque of electric machine 5 is able to change too, the change of the torque of electric machine 5 in time interval $t_1$ to $t_2$ is averaged compared to its value at time $t_1$ and added to the ascertained torque (see above). Consequently, the torque of torque-converter lockup clutch 6 of torque converter 5 is given by the relationship $M_{LC} = M_{EIMt1} - M_{dynamic\ correction} + M_{average\ value\ change\ electric\ machine}$.

$t_3$: Separating clutch 4 is brought to the torque required for the start of internal combustion engine 3, that is, it is driven having slip.

$t_4$: Separating clutch 4 has hunted to a stationary value, internal combustion engine 3 beginning to rotate and to accelerate.

$t_5$: Internal combustion engine 3 has almost reached the rotary speed of electric machine 5, there still just being slip in separating clutch 4.

For the adaptation of the operation of separating clutch 4, as was described above, the time interval between times $t_4$ and $t_5$ is drawn upon in a meaningful manner by calculating a rotary pulse balance there. Such a calculation directly after $t_3$ would be faulty, based on the still high change speeds of the influential variables, especially if the phase position of the input variables is not correct.

Clarifying the designation of the graphs of FIG. 2, we have:
$M_{EIM}$: torque of the electric machine.
$M_{LC}$: torque of the torque-converter lockup clutch.
$M_{converter}$ torque of torque converter 7.
$M_{K1}$: torque of separating clutch 4.
From this is yielded a torque balance 16.

In the lower partial illustration of FIG. 2, there is correspondingly represented rotary speed $n_{EIM}$ of electric machine 5, as $n_{BKM}$ the rotary speed of internal combustion engine 3, and as $n_{converter}$ the rotary speed of torque converter 7, in each case plotted against time t.

The following relationship comes about for calculating the expected rotary speed change $\Delta n$, which corresponds to a change in angular speed $\Delta\omega$, between times $t_4$ and $t_5$, the numerator of the fraction shown designating the rotary pulse change in the designated time interval:

$$\Delta\varpi = \frac{\int_{t4}^{t5}(M_{EIM} - M_{LC} - M_{converterr} - M_{K1})\cdot dt}{J}$$

A control device 14, in particular a control unit 15, is not able to integrate continuously, based on the electronic conditions, so that, in its calculating grid, the formula occurs by summation over individual time periods $t_4$ to $t_5$, according to the following relationship:

$$\Delta\omega = \frac{\sum_{t4}^{t5}(M_{MEIM} - M_{LC} - M_{converter} - M_{K1})\cdot \Delta t}{J}$$

The value thus calculated is compared to the actual rotary speed change, as it is present and was ascertained in time interval $t_4$ to $t_5$. If the agreement is not sufficiently accurate, it is assumed that the error observed (the corresponding difference) was caused by separating clutch 4 (influential variable $M_{K1}$). The characteristics line of separating clutch 4 is then changed for the next start, so that the observed error becomes smaller the next time, that is, at the next restart of internal combustion engine 3 via electric machine 5 in the electrical driving operation of the vehicle. The rotary speed may, for example, have fallen more than expected. Accordingly, separating clutch 4 has supplied too much torque and is now changed in its operating behavior in such a way that in the future it will supply less torque for the same requirement. After the installation of a new separating clutch 4, it makes sense to undertake the adaptation at first in relatively rough steps, train the operating guidance of the clutch correspondingly roughly, in order to achieve a rapid compensation for the error that then inevitably occurs. After a sufficient number of such learning processes/adaptations have taken place, the number of learning steps is reduced and the step dimension/adaptation dimension is reduced in size. By doing this, one achieves great robustness against possible outliers, when the adaptation has hunted to a steady state.

In a meaningful manner, the adaptation is carried out only for starts in which no extreme boundary conditions have occurred, particularly no high rotary speed gradients, transmission shifts, very high or very low rotary speeds. The adaptation is able to be carried out reliably only if the start triggering is triggered at closed torque-converter lockup clutch 6 of torque converter 7 (compare time $t_0$ in FIG. 2).

FIG. 3 shows an exemplary method in an embodiment. In box 31, the separating clutch may be operated in slip operation for cranking up the internal combustion engine. In box 32, a time interval between the separating clutch reaching a stationary state after being operated to start the internal combustion engine (time $t_4$ in FIG. 2) and the internal combustion engine almost reaching a speed of the electric machine (time $t_5$ in FIG. 2) may be identified. In box 33, during the time interval, an expected rotary speed change of the electric machine may be calculated. In box 34, the expected rotary speed change may be compared to an actually occurring rotary speed change. In box 35, a position of the separating clutch may be adjusted such that the separating clutch supplies less torque when the actually occurring rotary speed change is less than the expected rotary speed change.

What is claimed is:

1. A method for adapting a separating clutch in a drive train system of a vehicle, the drive train system having an electric machine, an internal combustion engine as well as an automatic transmission having an hydraulic torque converter and a torque-converter lockup clutch, and the separating clutch lying between the electric machine and the internal combustion engine, and the internal combustion engine being started by the electric machine while the electric machine is driving the vehicle, comprising:
   in a time interval, operating the separating clutch in slip operation for cranking up the internal combustion engine;
   in the time interval, calculating, by a control unit, an expected rotary speed change of the electric machine;
   comparing, by the control unit, the rotary speed change expected by calculation for deviation to an actually occurring rotary speed change of the electric machine; and
   adapting, by the control unit, the separating clutch in accordance with the ascertained deviation, wherein the separating clutch has a characteristics line, and wherein the characteristics line is changed for the adaptation of the separating clutch.

2. The method according to claim 1, wherein, for the calculation of the expected rotary speed change, a torque of the electric machine, a torque of the torque-converter lockup clutch assigned to the converter, a torque of the torque converter and a torque of the separating clutch are taken into account.

3. The method according to claim 1, wherein a torque of the torque-converter lockup clutch assigned to the converter is recorded at a time $t_1$ to $t_2$, by operating the torque-converter lockup clutch—while having slip, and a value recorded is corrected via a dynamic behavior of a rotary speed of the electric machine observed in the process.

4. The method according to claim 1, wherein the following relationship is used for calculating an expected rotary speed change:

$$\Delta\varpi = \frac{\int_{t4}^{t5}(M_{EIM} - M_{LC} - M_{converter} - M_{K1})\cdot dt}{J}$$

$$\Delta\omega = \frac{\sum_{t4}^{t5}(M_{MEIM} - M_{LC} - M_{converter} - M_{K1})\cdot \Delta t}{J},$$

$\Delta\omega$ being the expected rotary speed change and J being a moment of inertia of the drive train.

5. The method according to claim 1, wherein an actual rotary speed change is ascertained using a rotary speed sensor and/or from electrical variables of the electric machine.

6. The method according to claim 1, wherein the characteristics line is a function of a clutch-control travel of the separating clutch and a transmitted slip torque of the separating clutch.

7. The method according to claim 1, wherein the method is performed by a drive train system of a vehicle having an electric machine, an internal combustion engine as well as an automatic transmission having an hydraulic torque converter and a torque-converter lockup clutch, and a separating clutch lying between the electric machine and the internal combustion engine, and the internal combustion engine being able to be started by the electric machine while the electric machine drives the vehicle, and a control device adapted for operation guidance of the separating clutch and/or the drive train system during starting of the internal combustion engine.

* * * * *